Figure 1:
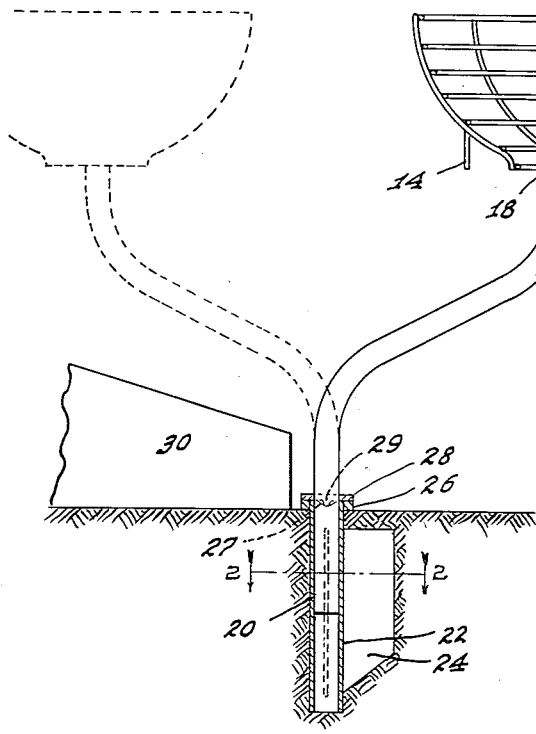

May 22, 1956    H. L. LEWIS    2,746,208
FLORAL-CONTAINER SUPPORT
Filed May 28, 1951

INVENTOR.
HAROLD L. LEWIS,
BY
Schley, Drash & Jenkins
ATTORNEYS.

United States Patent Office 2,746,208
Patented May 22, 1956

2,746,208

FLORAL-CONTAINER SUPPORT

Harold L. Lewis, Indianapolis, Ind.

Application May 28, 1951, Serial No. 228,603

1 Claim. (Cl. 47—41)

This invention relates to a pivotally supported floral container, especially advantageous for use in cemeteries, although not limited to that use.

By "floral containers," I mean any of various containers for decorative arrangements of the type used in cemeteries, including not only containers for growing plants, such as flowers, ivy, and other decorative plants, but also containers for cut flowers and artificial or dry flower arrangements.

The well-kept appearance of a cemetery depends largely upon the maintenance of its lawn, and frequent and regular mowing of the lawn is essential. This involves not only the mowing of the open areas of the lawn but also trimming around headstones and other obstructions to mowing. Various floral containers are used and these frequently rest in the ground in areas which are otherwise open and could easily be mowed save for their presence. Trimming around them is slow, and to avoid it, the containers must be moved to clear the path of the mower. Where they rest for any extended time, they tend to retard or kill the grass, and workmen often fail to return them to their original position with the result that various areas of lawn are killed or retarded. In addition, the haphazard moving of the flower arrangements to clear the path for mowing often leaves them in unsuited positions where they create a poor appearance.

It is the object of my invention to provide a floral container which is so mounted that it offers little or no interference with regular mowing operations, and in which the ground support for the container may be placed close to some other obstruction, for example a headstone, where trimming must be done in any event, so that the container presents no obstruction to the regular mowing of otherwise open lawn areas and creates no extra areas which require trimming. It is an object of my invention to provide such a container support which need not be moved from its normal ground support position to permit mowing of the otherwise open areas.

In accordance with my invention, I support the container on an offset leg pivoted on a ground support for swinging movement about a vertical axis, so that the leg can be swung about the pivotal axis to carry the container out of the path of a mower. Preferably, I provide interengaging means between the pivot parts which biases the leg against free swinging movement. The ground support is preferably a socket which can be driven into the ground close to a headstone, and I preferably arrange the interengaging means to hold the leg normally in a position extending away from the headstone, so the container will be spaced from the headstone. When the leg is swung about its pivot, it and the container will lie above the headstone wholly out of the way of the mower.

Figure 5:
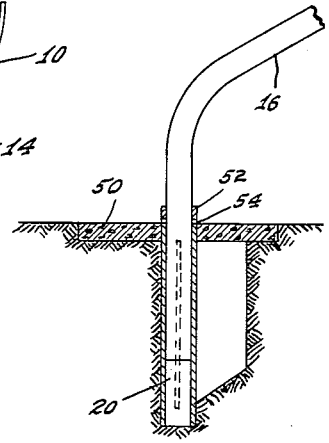
Figure 2:
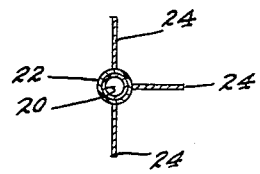
Figure 3:
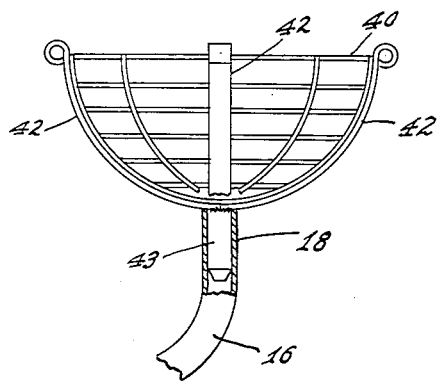
Figure 4:
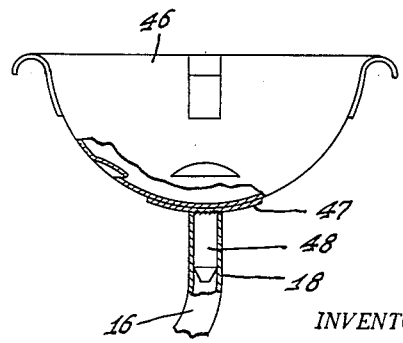

The accompanying drawings illustrate my invention. In such drawings, Fig. 1 is a side elevation showing an embodiment of my invention in which the container is an open-mesh basket; Fig. 2 is a section taken on the line 2—2 of Fig. 1 and showing the socket construction; Fig. 3 is a vertical section showing a modified form of open-mesh basket; Fig. 4 is a vertical section showing a container for growing plants; and Fig. 5 is a fragmental section showing an alternative ground support especially suited for cemeteries having flush-mounted grave markers.

The embodiment of my invention shown in Fig. 1 comprises an open mesh basket 10 made of wire and suitable for a floral arrangement. The basket has a central mounting sleeve 12 and may have legs 14 to support it during the filling operation. The basket 10 is supported on a leg 16 which is reversely bent through two 45° arcs so that its upper and lower ends are parallel but offset from each other. Its upper end forms a mounting post 18 received in the socket 12, and its lower end forms a pivot 20 for reception in a supporting socket 22. The amount the leg is offset may be varied, but is desirably sufficient so that the floral arrangement in the basket 10 will be wholly at one side of the axis of the pivot 20.

The supporting socket 22, which is driven into the ground, is a tube provided with radial stabilizing vanes 24. The upper end of the socket 22 carries a collar 26, and the leg 16 carries a cooperating collar 28 resting on the collar 26 to support the leg 16 at the desired elevation. Preferably, the collars 26 and 28 are respectively provided with a notch 27 and a cooperating detent 29 which interengage to hold the leg 16 in a predetermined radial position with respect to the axis of the socket 22, as shown in full lines in Fig. 1. The interengagement is sufficient to prevent the wind from swinging the basket 10 and leg 16 from this position, but readily permits the leg and basket to be swung manually about the pivot axis to other positions such as that shown in dotted lines in Fig. 1.

Desirably, the vanes 24 on the socket 22 are arranged to leave one side of the socket clear, so that it can be driven into the ground close to a headstone 30; and the notch 27 and detent are suitably located to position the basket a distance from the headstone 30. When it is desired to mow the lawn, the leg 16 and basket 10 are swung about the axis of the socket 22 to the dotted line position shown. In this position, the basket and leg will overlie the headstone 30 and will clear adjacent areas for free passage of a mower close to the headstone 30. The basket will create no need for trimming beyond that necessary in any event on account of the presence of the headstone 30. After the mower has passed, the basket is swung pivotally back to its normal position, predetermined by the location of the notch 27 and detent 29.

In the modified basket arrangement shown in Fig. 3, the basket 40 is bowl-shaped and of open-mesh construction, and is removably received in a frame 40 carried by the leg 16. The frame comprises four radially extending and upwardly curved arms 42 mounted on a stud 43 which is received in the upper open end of the mounting post 18. The frame 40 can also be used to support a bowl containing a soil bed for growing flowers.

In Fig. 4, the flower container 46 is a bowl or pot, adapted to hold a soil bed for growing plants. As shown, this is mounted on a reinforcing plate 47 attached to a stud 48 similar to the stud 43 of Fig. 3 and similarly received in the open upper end of the mounting post 18.

Some cemeteries use grave-markers mounted flush with the ground, which present no obstruction to a lawn mower. The arrangement shown in Fig. 5 is especially suited for use in such cemeteries, and indeed in any situation where the container is mounted in an otherwise unobstructed area. The socket 20 may be the same as in Fig. 1, but here it is shown with the collar 26 omitted. It is driven in the ground, with its upper end flush with the surface thereof, and a centrally-apertured disk 50 of concrete or other material is dropped over its upper end, flush with the ground, to prevent the growth of grass in a small area immediately surrounding the socket 20.

The leg 16 as shown in Fig. 5 carries a collar 52 of the same diameter as the socket 20, to support the leg in the socket 20, and the leg is biased against free swinging movement by the presence of a multiple-toothed lock-washer 54 between the collar and the upper end of the socket 20.

With the disk 50 preventing growth of grass in the small area immediately adjacent the socket 20, a lawn mower passing close to the leg 16 will cut the grass up to and including the edge of the grass at the periphery of the disk, and no hand trimming will be required.

I claim as my invention:

A floral container and support adapted for use on a cemetery lawn, comprising a socket to be permanently sunk in the ground with its upper end substantially at ground level to be substantially un-noticeable and present no obstruction to mowing of the lawn in the absence of a container support therein, a container-supporting leg comprising a single rod-like member having a lower straight end adapted to be rotatably and removably received in said socket and extending upward therefrom to a point adapted to lie above the normal level of grass or foliage on the lawn and above the top edge of a headstone adjacent to which the socket is positioned, then smoothly curved and merged to an upward diagonal portion, then smoothly curved in an opposite direction and merged to an upper straight end parallel with the lower end and offset therefrom and terminating at its top in one element of a vertical pin and socket mounting, and a flower receptacle having at the bottom thereof the companion element of such pin and socket mounting adapted to be rotatably and removably received by the leg-carried mounting element, the offset of said leg being sufficient to dispose the flower receptacle wholly to one side of the axis of the ground-received socket when the receptacle is mounted on the upper end of the leg and the leg is received in the socket, whereby in a container and support mounted adjacent a headstone, the leg can be swung to a position in which the receptacle lies over the headstone to clear the adjacent lawn area for mowing and swung to an opposite position in which it and the receptacle is clear of the headstone.

References Cited in the file of this patent

UNITED STATES PATENTS

| | | |
|---|---|---|
| 296,028 | Martin | Apr. 1, 1884 |
| 942,859 | Kersey | Dec. 7, 1909 |
| 1,292,421 | Bickel | Jan. 28, 1919 |
| 1,786,994 | Halberstadter | Dec. 30, 1930 |
| 2,550,602 | Rothe | Apr. 24, 1951 |